United States Patent [19]
Phillips

[11] Patent Number: 5,515,815
[45] Date of Patent: May 14, 1996

[54] SELF-FLUSHING THERMOSTAT

[75] Inventor: George E. Phillips, Oshkosh, Wis.

[73] Assignee: Brunswick Corporation, Lake Forest, Ill.

[21] Appl. No.: 349,037

[22] Filed: Dec. 2, 1994

[51] Int. Cl.⁶ ........................................... F01P 7/14
[52] U.S. Cl. ............................................. 123/41.1
[58] Field of Search ................... 123/41.08, 41.09, 123/41.1

[56] References Cited

U.S. PATENT DOCUMENTS

| | | | |
|---|---|---|---|
| 2,268,083 | 12/1941 | Rapuano | 123/41.08 |
| 4,091,991 | 5/1978 | Sliger | 123/41.08 |
| 4,370,950 | 2/1983 | Furukubo | 123/41.08 |
| 5,337,704 | 8/1994 | Roth | 123/41.1 |

FOREIGN PATENT DOCUMENTS 2667354  4/1992  France ........................ 123/41.08

*Primary Examiner*—Noah P. Kamen
*Attorney, Agent, or Firm*—Wood, Phillips, VanSanten, Clark & Mortimer

[57] ABSTRACT

A cooling water flow control device for a water cooled outboard motor comprising a valve seat for a thermostatic cooling water control valve that provides a wide opening for the passage of foreign matter trapped between the valve stem and seat when the cooling water passing over the valves exceeds a selected limit. The valve seat comprises an annular opening having a side wall smaller at the top than the bottom and varying in diameter. A step in the side wall provides an abrupt enlargement in the water passage through the valve for the passage of foreign matter blocking the valve.

5 Claims, 2 Drawing Sheets

SELF-FLUSHING THERMOSTAT

FIELD OF THE INVENTION

This invention is in the field of thermostatic water flow control valves for use in water cooled motors; specifically, a device that permits the use of large diameter thermostatic valves to control water flow through an outboard motor water cooling system.

BACKGROUND OF THE INVENTION

In watercooled outboard motor systems, water is taken in through an inlet in the drive shaft housing, pumped through the water cooling passages in the motor block and cylinder head and then out of the motor, typically through the exhaust system. While the water inlet is designed to stop the ingestion of foreign matter into the system, small shells and other debris do sometimes get into the cooling water passage and can clog the water passage around the thermostatic control valve, particularly when the motor is operating at low power when less cooling water is required and the thermostatic control valve is more nearly closed.

Thermostatic flow control valves, well known in the art, open and close in response to the temperature of the water passing over the temperature sensing element of the valve.

All known prior art outboard motors that utilize a thermostatic valve to control the rate of flow of cooling water to control the temperature of the engine utilize a valve of relatively small diameter when compared to such valves utilized in larger four cycle automobile or marine engines. Such small diameter valves have been utilized in outboard motors because the range of movement of the valve stem renders them effective in maintaining the required flow of cooling water through the motor at all throttle settings in order to maintain the desired operating temperature of the motor.

One problem with these small diameter valves is that they are subject to being clogged by foreign matter entering the cooling water system through the water intake. The clogging results from the fact that these valves cannot open far enough to let the foreign matter pass through the flow control passage between the valve stem and seat. When the valve clogs, the flow of cooling water stops or is restricted, the motor overheats and can be damaged.

The primary objective of this invention is to provide a larger valve opening when the valve is obstructed by foreign matter and the temperature of the cooling water rises dangerously, to enable the foreign matter to pass through the thermostatic control valve and out of the cooling water system.

A further objective of the invention is to maintain consistent desired rates of cooling water flow through the motor during normal operation when the valve opening is not obstructed by foreign matter and thereby avoid undesired temperature fluctuations.

SUMMARY OF THE INVENTION

The invention is of a thermostatically controlled valve for controlling the flow of cooling water through the cooling water passage of an outboard motor comprising a valve seat and a thermostatically controlled valve stem. The valve seat comprises a body having top and bottom surfaces and having an annular opening therethrough more narrow at the top than the bottom, the side wall of the annular opening varying in diameter between the top and bottom surfaces of the valve seat. The valve stem comprises a cylindrical member and thermostatic means responsive to the temperature of the water passing over the valve for axially moving the cylindrical member through an operating range relative to the annular opening in the seat, whereby the lateral clearance between an edge of the cylindrical member and the side wall of the annular opening changes, relatively opening and closing the valve.

The side wall of the annular opening may have a step therein at which point the diameter of the seat is abruptly enlarged; or the diameter of the annular opening at the bottom of the seat body may be smaller than the diameter of the water passage in which the valve is installed. In either case, the water passage through the valve substantially and abruptly increases in size as the edge of the cylindrical member is moved adjacent to the area of the enlarged diameter.

DETAILED DESCRIPTION OF THE PREFERRED EMBODIMENT

Figure 1A:
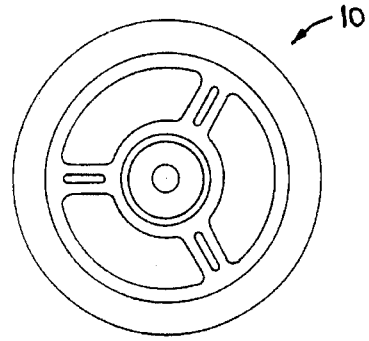
FIG. 1(a) is a downstream plan view of a thermostatic cooling water control valve of the prior art.
Figure 1B:
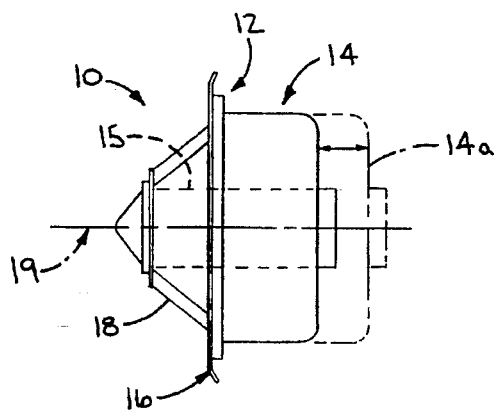
FIG. 1(b) is a side elevation of a thermostatic cooling water control valve of the prior art.

FIG. 1 is a drawing of a thermostatic valve 10 manufactured by Robert Shaw Controls Co. of Knoxville, Tenn. The valve 10 is basically comprises of an annular valve seat 12, an cylindrical cup-shaped valve stem 14 and temperature sensitive actuating element 15 responsive to the temperature of the surrounding cooling water for moving the cup 14 between the fully closed position and the fully open position shown by the dotted line designated 14a. A collar 16 is attached to the valve seat 12, projects outwardly therefrom and is used to fasten the valve 10 in operating position. A three legged spider mount 18 attached to and extending on the side of the collar 16 away from the cup 14, supports the thermostatic element 15 which moves the cup 14 relative to the seat 12. In operation, the valve 10 opens and closes by movement of the cup 14 relative to the seat 12 as illustrated by the arrows on FIG. 1(b).

Figure 2:
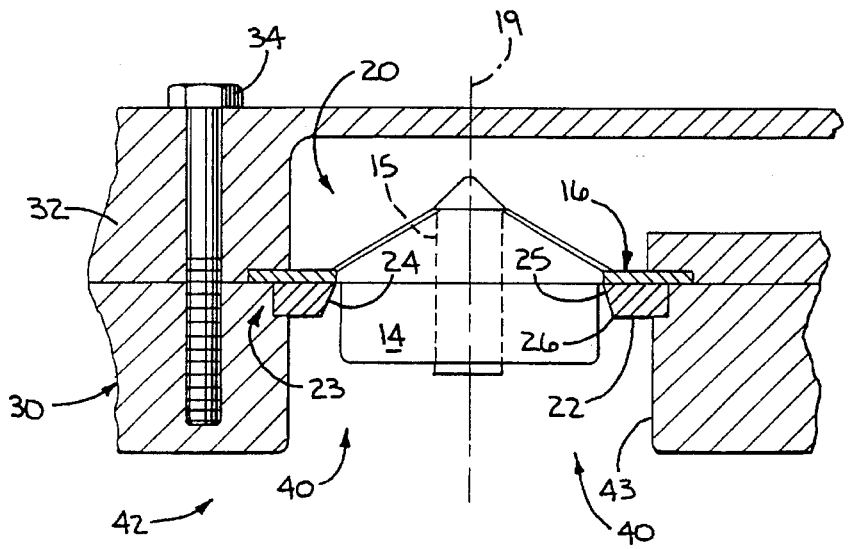
FIG. 2 is a schematic cross-sectional view of the thermostatic control valve of the invention installed in the cooling water passage in the power head of an outboard motor, showing the valve in a relatively closed position.
Figure 3:
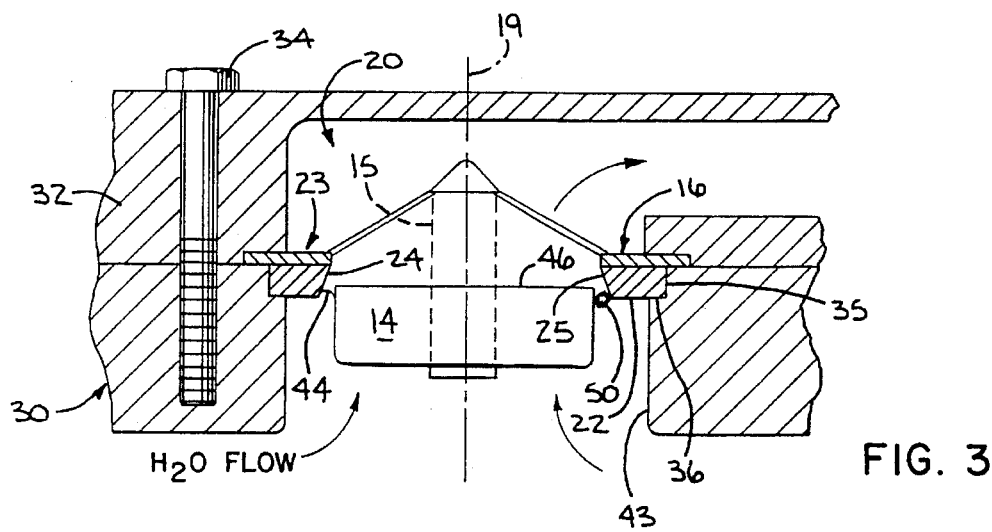
FIG. 3 is a schematic cross-sectional view showing the valve of FIG. 2 in a partially open position typical of normal operation of the motor.
Figure 4:
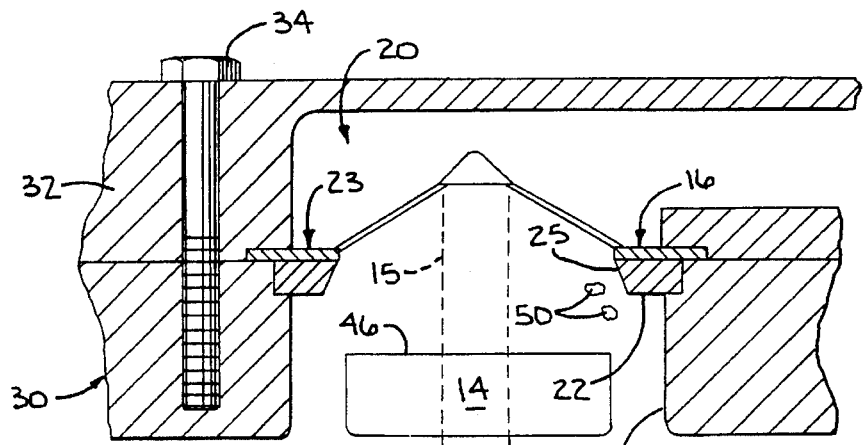
FIG. 4 is a schematic cross-sectional view showing the valve of FIG. 2 in a more fully open position.

Referring to FIG. 2, the valve 20 of the invention expands upon the basic structure of the thermostatic valve illustrated in FIG. 1, by the addition of a modified seat 22. The seat 22 may be attached to the retaining collar 16 by riveting or other suitable means. FIGS. 2–4 illustrate the retaining collar 16 for the valve 20 as trapped between the cylinder head 30 of the motor and a cover plate 32 for the thermostatic valve 20. The cover plate 32 functions to hold a thermostatic control valve 20 in the operating position and to channel cooling water exiting from the cylinder head 30 via passage 44 into the cooling passages of the exhaust manifold (not shown). The cover plate 32 is typically secured to the cylinder head 30 by bolts 34 so that it may be easily removed for access to the valve 20.

FIGS. 2–6 illustrate the shape of a valve seat 22 of the invention and its relationship to the cylindrical stem member or cup 14 as the valve 20 opens and closes in response to the temperature of the cooling water exiting the cylinder head 30 after it has cooled the cylinder block. The structure of outboard motor water cooling systems are well known in the art and form no part of this invention apart from the features of the control valve claimed herein.

The seat 23 of the valve 20 is comprised of the collar 16 and a body 22, sometimes referred to herein as the control ring. An annular opening 21 passes through the body 22 of the valve seat. The side wall 24 of the opening 21 varies in diameter being generally more narrow at the top than the bottom. The sloping side wall 24 forming an acute angle with the longitudinal axis 19 of the valve provides a gradually opening passage 44 through the valve as the stem cup 14 moves downwardly in the illustration opening the valve 20. By varying the profile of the wall 24, one familiar with the performance of a thermostatic flow control valve such as that illustrated in FIG. 1, can fine tune the rate of cooling water flow through a motor at various cooling water temperatures.

Referring to FIGS. 2–4, the control ring 22 is positioned within an annular cut 35 into the wall 43 of the water passage 42 where the power head 30 and the valve cover plate 32 come together. The cut 35 provides a shoulder 36 against which the control ring 22 is pressed and held in place by pressure of the cover plate 32 and retaining collar 16. As the water 40 heats up, the thermal element 15 of the valve 20 expands moving the cup 14 downwardly in the illustration. In so doing, the cup 14 is unseated and the water passage 44 (FIG. 3) through the valve 20 becomes the annular opening between the upper annular edge 46 of the cup 14 and the tapering wall 24 of the control ring 22.

It is evident from FIG. 3 that as the cup 14 moves away from the collar 16, the clearance between the sloping wall 24 of the control ring 22 and the edge 46 of the cup 14 increases, allowing more cooling water to pass through the passage 44.

During normal operation of an outboard motor through various throttle settings, the valve 20 will open and close in response to the temperature of the cooling water 40. The thermal actuating means 15 senses the temperature of the cooling water 40 and in response thereto moves the cup 14 between the closed position where the edge 46 of the cup 14 is adjacent the top edge 25 of the control ring 22 and the open position where the edge 46 of the cup 14 is adjacent the bottom edge 26 of the tapering wall 24 of the control ring 22. Absent the presence of any foreign matter blocking water flow through the valve 20, the gradual opening and closing of the valve 20 resulting from the positioning of the cup 14 with respect to the tapered wall 24 of the control ring 22 enables the valve to provide a steady flow of cooling water and thereby maintain the desired operating temperature of the motor at any selected throttle setting.

A significant element of the invention as illustrated in FIGS. 2–4 is that the bottom annular edge 26 of the annular opening 21 through the control ring 22 lies inside the wall 43 of the passage 42 where it meets the control ring 22; so that the diameter of the annular passage 42 is larger than the diameter of the annular opening 21 in the control ring 22 at the lower edge 26 of its tapered wall 24. This construction, coupled with the ability of the thermal sensing means 14 to move the cup 15 axially below the control ring 22, gives the valve 20 of the invention the unique capability of opening beyond its normal operating range, as illustrated in FIG. 4. With the edge 46 of the cup 14 positioned below the control ring 22, as illustrated, passage 44 is widely opened, so as to permit foreign matter 50 trapped between the cup 14 and the ring 22 to pass through the valve 20 and thus out of the cooling system.

Figure 5:
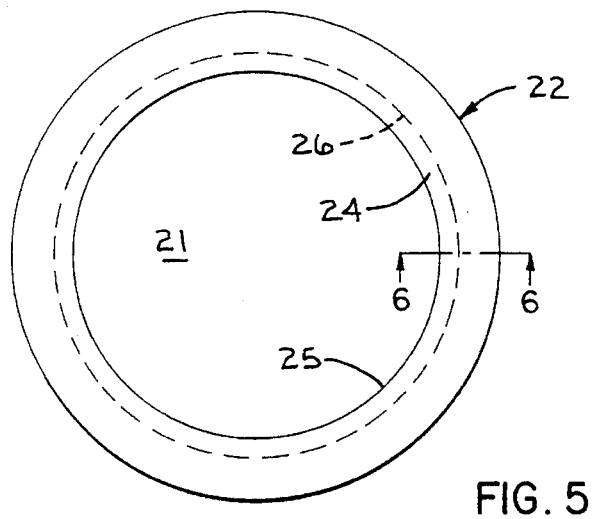
FIG. 5 is a plan view of a valve seat of the invention.
Figure 6A:
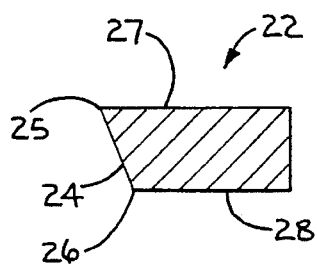
FIG. 6a is a cross-sectional view of a valve seat of the invention taken along line 6—6 of FIG. 5.
Figure 6B:
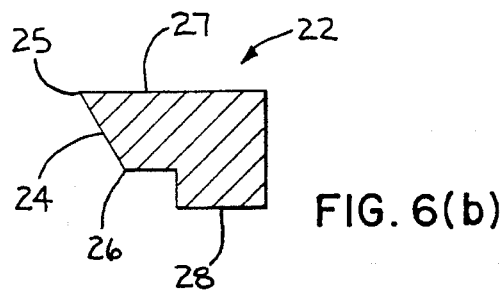
FIG. 6b is a cross-sectional view of an alternate configuration of a valve seat of the invention.

FIG. 5 illustrates a flow control ring 22 of the invention. The ring is preferably made of plastic, aluminum or brass and has a thickness between 0.19 and 0.5 inches. The top surface 27 and bottom surface 28 are flat and parallel. The wall 24 of the annular opening 21 through the control ring 22 is flat forming a frusto-conical surface. Alternately the surface 24 may include a step as illustrated in FIG. 6b to achieve a desired clearance between the wall 24 and the cup 14 at selected water temperatures. The step such as illustrated in FIG. 6b may replace the above described difference between the diameter of the flow control ring 22 at its open edge 26 and the diameter of the adjacent cooling water passage 42. Other profiles of the wall 24 of the passage 20 designed to control water flow at particular water temperatures are conceivable without departing from the teachings of the invention.

It will also be appreciated by those of ordinary skill in the art that while the invention has been here described as incorporated in an outboard motor, that it may also have application in other types of water cooled motors or engines.

It will be understood that the invention may be embodied in other specific forms without departing from the spirit or central characteristics thereof. The present example, therefore, is to be considered in all respects as illustrative and not restrictive, and the invention is not to be limited to the details given herein.

I claim:

1. In a water cooled outboard motor having a cylinder block, a cylinder head, and a water cooling passage therethrough, an improved valve means disposed within the water cooling passage for controlling the rate of flow of water through the passage, said valve means comprising:

a valve seat comprising a body having a top and bottom surface and an annular passage between said surfaces more narrow at the top surface than at the bottom, the annular passage having a side wall;

a valve stem comprising a cylindrical member having a circular edge;

means for supporting the valve stem for concentric axial movement relative to the annular passage of the valve seat; and means responsive to the temperature of the cooling water passing over the valve for positioning the edge of the cylindrical member of the stem through a range of positions within the annular passage during normal operation of the motor, and for positioning the edge of the cylindrical member of the stem axially below the bottom surface and outside the annular passage of the seat when the temperature of the cooling water exceeds a preselected limit, whereby the area for water passage between the seat and the edge of the cylindrical member of the stem is greatly increased so that foreign matter caught in the valve may pass through.

2. In a water cooled outboard motor having a cylinder block, a cylinder head, and a water cooling passage therethrough, an improved valve means disposed within the water cooling passage for controlling the rate of flow of water through the passage, said valve means comprising:

a valve body comprised of a valve seat having a circular passage therethrough comprised of a tapered wall more narrow at the top than the bottom;

a valve stem comprising a circular member having a circular edge; and thermal actuating means for positioning the valve coaxially of the annular passage through the valve body over a preselected range of positions in response to the temperature of the cooling water, wherein the wall extends axially downwardly surrounding the edge of the valve stem when the water temperature is within a preselected temperature range, but short of surrounding the edge of the valve stem when the water temperature exceeds a preselected maximum temperature.

3. In a valve for controlling the flow of cooling water through an outboard motor having a valve body supporting a valve seat, a valve stem and a thermal actuating means for moving the stem in response to the temperature of the cooling water and means for mounting the valve in the water passage of the motor, an improved means for controlling the water flow through the valve comprising:

thermal actuating means for moving the valve stem through an operating range between a closed position and a fully open position relative to the valve seat, a flow control ring surrounding the stem and having a generally frustoconical cross-section, said flow control ring being axially aligned with the valve seat and widening in the direction of the valve stem, said ring having a length sufficient to surround the stem through the stem operating range during normal temperature operation of the motor, but short of surrounding the stem when the operating temperature of the motor exceeds a preselected value.

4. The improvement of claim 3 wherein the valve is mounted between the cylinder block and the head of the motor and wherein the mounting means comprises a first undercut in one of the block and head of the motor to accept the valve seat and a second undercut in the cylinder block of the motor equal in depth to the length of the control ring, so that the block and head comprise means for positioning the seat and the control ring within the water passage.

5. The improvement of claim 4 wherein the length of the control ring is substantially equal to the range of axial motion of the valve stem and wherein the control ring comprises an outward step adjacent to the position of the valve stem when the cooling water reaches a preselected temperature, whereby the water passage through the valve substantially widens when the stem is opposite the step so that foreign matter trapped in the valve may move through the valve.

\* \* \* \* \*